(12) United States Patent
Villa (10) Patent No.: US 7,166,267 B2
(45) Date of Patent: Jan. 23, 2007

(54) SOLID SOLUTIONS, APPLICABLE AS CATALYSTS, WITH PEROVSKITE STRUCTURE COMPRISING NOBLE METALS

(75) Inventor: Pierluigi Villa, L'Aquila (IT)

(73) Assignee: Universita Degli Studi di L'Aquila, L'Aquila (IT)

( * ) Notice: Subject to any disclaimer, the term of this patent is extended or adjusted under 35 U.S.C. 154(b) by 230 days.

(21) Appl. No.: 10/483,775

(22) PCT Filed: Jul. 16, 2002

(86) PCT No.: PCT/EP02/07906

§ 371 (c)(1), (2), (4) Date: May 7, 2004

(87) PCT Pub. No.: WO03/008095

PCT Pub. Date: Jan. 30, 2003

(65) Prior Publication Data

US 2004/0202598 A1  Oct. 14, 2004

(30) Foreign Application Priority Data

Jul. 17, 2001 (IT) .......... MI2001A1519

(51) Int. Cl.
*B01D 53/72* (2006.01)
*B01D 53/94* (2006.01)
*C01B 3/40* (2006.01)
*C01G 25/00* (2006.01)
*C07C 11/00* (2006.01)

(52) U.S. Cl. .......... 423/594.12; 423/594.16; 423/593.1; 423/263; 423/651; 423/418.2; 423/245.3; 502/302; 502/303; 502/304; 502/325; 502/340; 502/525; 502/349; 252/373; 60/299; 585/500; 431/2

(58) Field of Classification Search .......... 423/594.12, 423/594.16, 593.1, 263, 245.3, 651, 418.2; 502/302, 303, 304, 325, 340, 525, 349; 432/2; 252/373; 60/299; 585/658, 500; 431/2
See application file for complete search history.

(56) References Cited

U.S. PATENT DOCUMENTS

| 4,107,163 | A |   | 8/1978 | Donohue |
| 4,321,250 | A |   | 3/1982 | Hart |
| 4,374,117 | A | * | 2/1983 | Arendt .......... 423/594.12 |
| 4,595,580 | A | * | 6/1986 | Uedaira et al. .......... 423/594.12 |
| 6,517,693 | B1 | * | 2/2003 | Taniguchi .......... 204/421 |

FOREIGN PATENT DOCUMENTS

| EP | 0 318 808 | 6/1989 |
| EP | 0 641 749 | 3/1995 |
| EP | 1 029 837 | 8/2000 |

OTHER PUBLICATIONS

Database WPI Section Ch, Week 199620 Derwent Publications Ltd., London, GB; AN 1996-195662 XP002191696 & JP 08 066621 A (Toyota Chuo Kenkyusho KK), Mar. 12, 1996 abstract.
Database WPI Section Ch, Week 199527 Derwent Publications Ltd., London, GB; AN 1995-203052 XP002191697 & JP 07 116519 A (Toyota Chuo Kenkyusho KK), May 9, 1995 abstract.

* cited by examiner

*Primary Examiner*—Timothy C. Vanoy
(74) *Attorney, Agent, or Firm*—Young & Thompson (57) ABSTRACT

Materials with a perovskite structure in form of solid solutions with general formula: $A_zZr_{1-x}B_xO_3$ Where A is Ba or a rare earth element, B is Pt, Ir, Rh or Ce z is 1 when A is Ba and is ⅔ when A is a rare earth, x is in the range 0.01 and 0.8.

10 Claims, 10 Drawing Sheets

Figure 1

A, B = Cations
X = Anions

SOLID SOLUTIONS, APPLICABLE AS CATALYSTS, WITH PEROVSKITE STRUCTURE COMPRISING NOBLE METALS

This invention concerns solid solutions with a perovskite structure comprising noble metals, which are useful as catalysts in combustion reactions and, in general, in oxidation processes at high temperature (production of syngas, olefins, elimination of VOC and unburned emission from motor-vehicles).

Perovskites are ceramic materials formed by the combination of metallic elements with non-metallic elements (usually oxygen) placed in a certain crystalline structure. Their name derives from the specific mineral 'Perovskite' ($CaTiO_3$). From a technological point of view, Perovskites are of considerable interest because the single crystalline structure can exhibit a wide range of properties.

Figure 1:
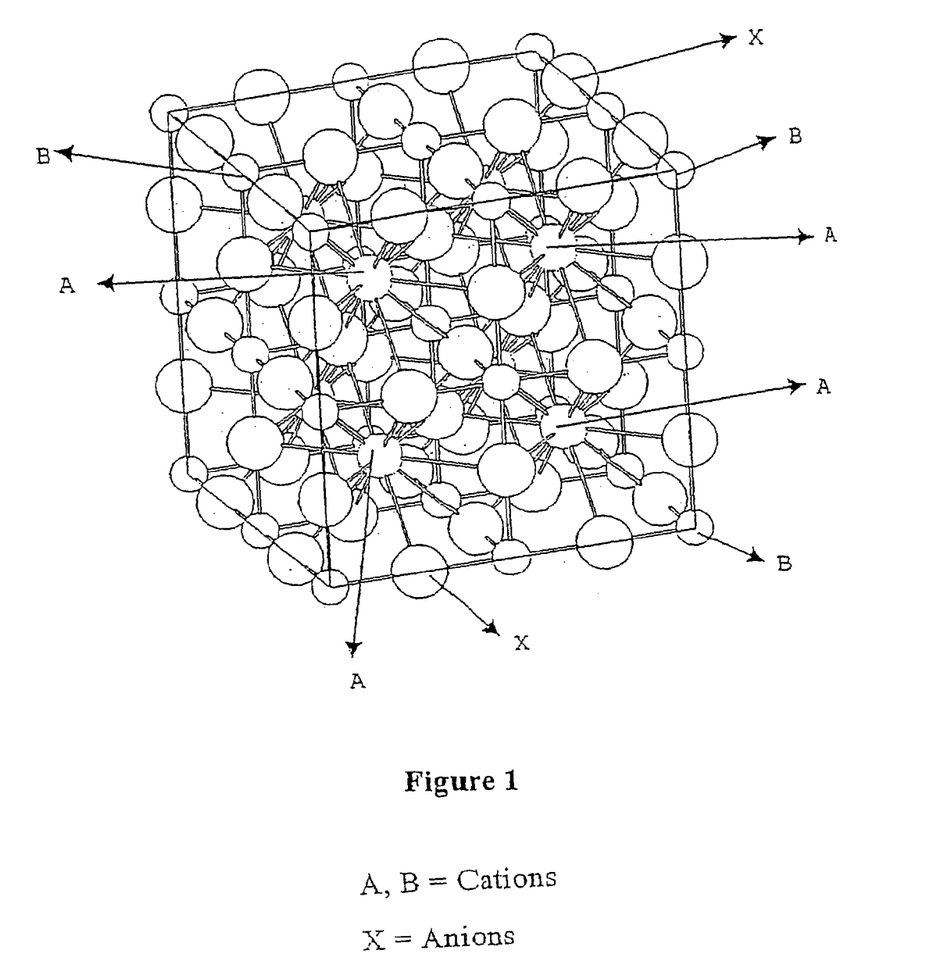
FIG. 1 illustrates the structure of a perovskite of the general formula $ABX_3$.

In their ideal structure perovskites have a general formula $ABX_3$ and consist of cubes composed of two metallic cations (A & B) and a non-metallic anion (X) in the ratio 1:1:3. In the cubic cell cations A are bigger and are co-ordinated with twelve X anions, while cations B, which are smaller, are co-ordinated with six X anions (FIG. 1).

The high symmetry of the atomic disposition imposes some constraints on the dimension of the ions within the structure, as shown by Goldschmidt [1]; it is therefore important to bear in mind the dimension of the element in the various oxidation states and in the different co-ordination numbers Table 1) [2].

TABLE 1 [2]

| Ion | Co-ordination number | Ionic radii (pm) |
|---|---|---|
| $Ba^{+2}$ | 6 | 149 |
| $Ba^{+2}$ | 12 | 175 |
| $Ce^{+3}$ | 6 | 115 |
| $Ce^{+3}$ | 12 | 148 |
| $Ce^{+4}$ | 6 | 101 |
| $Ce^{+4}$ | 12 | 128 |
| $Pd^{+2}$ | 6 | 100 |
| $Pd^{+3}$ | 6 | 90 |
| $Pd^{+4}$ | 6 | 75.5 |
| $Zr^{+4}$ | 6 | 86 |
| $O^{-2}$ | — | 121 |
| $Rh^{+3}$ | 6 | 80.5 |
| $Rh^{+4}$ | 6 | 74 |
| $Rh^{+5}$ | 6 | 69 |

Inspection of the scientific and patent literature shows that current syntheses very often involve a rare earth element in position A, and a transition element (such as Fe, Mn, Co, Ni, Cr) in position B, and that very few perovskites containing noble metals in a high oxidation state have been synthesised up to now.

Materials with a perovskitic structure having the general formula $A_zZr_{1-x}B_xO_3$ are now found where:

A is Ba or a rare earth element;
B is Pt, Ir, Pd, Rh, or Ce;
z is 1 when A is Ba and ⅔ when A is a rare earth element;
x is in the range 0.01 to 0.8;
A is usually Ba or La (more usually Ba);
B is usually Pd, Rh or Ce.

The materials according to this invention in which B is Pd or Ce are particularly suitable as catalysts for the catalytic combustion of methane for power application. Catalysts based on supported Pd are currently the only ones displaying a catalytic activity for methane combustion high enough to light-off the reaction at low temperature inlet conditions, low contact times and lean fuel concentrations characteristic of modern gas turbines fed with natural gas. Another favourable characteristic of these systems is the negligible volatility of the various species of Pd (metal, oxide, hydroxide) below 1000° C.

The catalysts based on supported Pd of the current technology display a complex hysteresis cycle which transforms the Pd into a metallic state which is catalytically inactive at high temperatures, with a further re-oxidation to PdO at lower temperatures (FIG. 2) [3].

Figure 2:
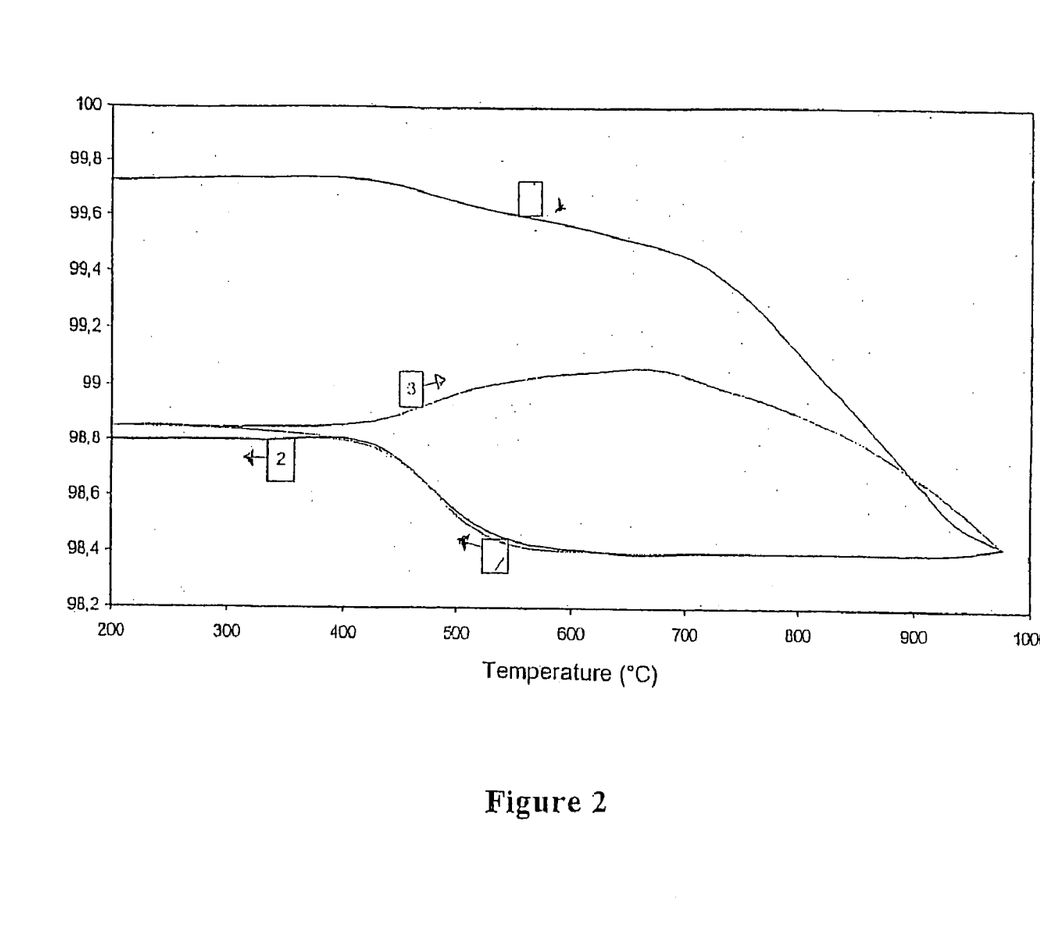
FIG. 2 illustrates a hysteresis cycle for a typical catalyst based on Pd supported on alumina.

FIG. 2 shows this hysteresis cycle for a typical catalyst based on Pd supported on alumina.

The catalyst 10 heated to 980° C. (curve 1), cooled to 200° C. (curve 2), heated again to 980° C. (curve 3) and cooled to 200° C. (curve 4). All the steps were carried out at 5° C./min.

The catalyst subjected to an air flow starts loosing weight at temperatures of around 400° C.; this weight loss is due to the loss of water chemisorbed on the surface. At temperatures higher than 800° C. the rate of weight loss is suddenly increased due to the transformation of PdO to Pd, which starts at this temperature and which is completed at 970° C. During a first cooling in air the sample only starts to gain weight below 570° C. and down to 380° C., but not all the weight lost in the previous step is recovered. When the sample is heated again a small weight loss is observed between 700° C. and 980° C., with a further gain during the cooling step similar to that of the previous cycle.

A certain degree of reduction of Pd together with its oxidised species is desirable because the first catalytic step involves dissociation of the C—H bond, which occurs on reduced species, whereas the further oxidation steps occur on the oxidised species [5].

For the above reasons it could be advantageous to utilise palladium in a high oxidation state that is fully reducible to the metallic state only at temperatures higher than those foreseen for an industrial operation ($\cong 1300°$ C.).

This goal has been realised with the present invention, which allows for the insertion of palladium in a high melting perovskite of the $BaZr_{1-x}Pd_xO_3$ type. Attention has been drawn in a previous patent (6) to the high melting point ($\cong 2600°$ C.) of the systems with a perovskite structure based on $BaZrO_3$.

In a similar way, the present invention concerns BaZr-$CeO_3$ systems in order to take advantage of the well known oxidising properties of $Ce^{+4}$.

One of the favourable characteristic of the barium-based systems is the limited production they permit of $NO_x$: recent studies have shown that barium has the ability to decompose $NO_x$ to $N_2$ and $O_2$, so that the barium-based systems proposed here may be of general applicability for all the combustion processes aiming at limiting $NO_x$ emission— including those for motor-vehicles.

The present invention allows for the substitution of at least part of the barium with a rare earth, such as lanthanum, in order to obtain systems which are strongly weight-stable at high temperatures. Catalysts containing large amounts of barium could pose problems at very high temperatures (as a result of the high volatility of barium) unless the barium is combined within the perovskite structure. The possibility of using perovskites composed of barium and a rare earth could further diminish such risk.

The materials of the present invention for which B is Rh are particularly suitable as catalysts for the partial oxidation of methane to syngas (CPO).

The two main technologies for the production of syngas are steam reforming of methane or virgin naphtha, and the non-catalytic autothermal processes.

Steam reforming involves as a first step, after the elimination of the sulphur containing compounds, the use of large scale catalytic reactors, prone to the formation of carbon, and with complex problems of downstream heat recovery.

The non-catalytic autothermal processes, on the other hand, involves very high temperatures in order to avoid the formation of carbon. As a consequence the use of a $O_2/CH_4$ ratio higher than the stoichiometric value and equal to about 0.7 becomes necessary, leading to the undesired formation of $H_2O$ and $CO_2$ which reduces the efficiencies of subsequent syntheses.

Various solutions have been proposed in order to overcome the above drawbacks, among which catalytic partial oxidation appears to be one of the most promising for the following reasons:

1) It involves carrying out the oxidation reaction, $CH_4 + 0.5\ O_2 \rightarrow CO + 2H_2$, at oxygen concentrations close to stoichiometric, and at lower temperatures (around 800–900°) thereby resulting in greater syngas yields, both in respect of methane and oxygen;

2) The oxidation reactions are very fast, involving very high space-velocities; yields are high, with contact times of the order of milliseconds: the reactors may therefore be very small;

3) The partial oxidation reaction leads to a production $H_2/CO$ ratio equal to 2, and therefore more suited to both Fischer-Tropsch and methanol syntheses;

4) The process is very fast, and being catalytic makes it possible to control better the carbon formation.

The most promising catalysts for the above goals are those containing rhodium in a high melting and non-acidic matrix, such as those of the $BaZr_{1-x}RhxO_3$ systems proposed here.

The materials of the present invention may be prepared with suitable modifications to the citrate method described in [6].

The citrate route is a wet method for the synthesis of mixed oxides, which was proposed by Delmon and co-workers in the late nineteen sixties as an alternative to co-precipitation and to the ceramic method for the manufacture of high tech ceramic materials and catalysts [7, 8, 9, 10, 11, 12].

This method offers a number of advantages, in particular it makes it possible to obtain:
  mixed oxides over a wide range of composition;
  good control of the stoichiometry;
  an excellent interspersion of the elements in final product;
  very small grain size materials.

The first step of the proposed preparation method consists of the preparation of an aqueous solution of the nitrates of the required metals with citric acid (in a ratio of 1 equivalent of citric acid per equivalent of cation) and if necessary ammonium hydroxide.

The solution obtained is then concentrated by evaporation in a rotavapor and dried under vacuum until a meringue-type spongy solid is obtained, which may easily be ground to an amorphous powder.

Calcination then follows, which eliminates the organic substance and yields the desired oxides: a microcrystalline solid is obtained, with the ions well interspersed, often in a monophasic system.

The starting salts generally used in the original method were nitrates, because of their good solubility. However problems arise with these solutions during concentration, drying and calcination, due to the evolution of nitrogen oxides. Nitrogen oxides, in addition to being toxic and corrosive to the materials of the oven, may lead to a sudden decomposition of the organic substance, possibly resulting in an explosion or fire hazard. This occurs particularly when cations are present (such as those of Mn, Fe, Co, Cu and Ag), which may catalyse the oxidation of the organic substance.

The proposed method (anticipated in previous patents [6, 13, 14, 15]) has now been modified and improved in order to make it more widely applicable and less hazardous.

In the new method:
  nitrates are not used as starting salts, particularly in the presence of elements displaying a high catalytic activity for the combustion of the organic materials;
  the decomposition is carried out in milder conditions than in the original citrate route, thus involving: a lean oxygen gas flow (1.5% $O_2$) and a low temperature (T~350° C.).

The method described in this invention combines the advantages of the wet methods with the possibility of utilising readily available reagents which are among the cheapest for the elements to be complexed; they are also easy to handle during the preparation, particularly in terms of temperature control.

The process envisages the following steps:

Preparation of the Solution

A clear solution containing the required elements is prepared using citric acid and ammonium hydroxide. The preparation then involves some special features which may be essential for achieving the final result. For example: as complexation is usually favoured by low temperatures, because of the low energy of activation in concentrated solutions, the use of externally ice-cooled solutions is preferred to favour the complexation of the cations and to reduce evaporation of ammonia. The dissolution of the noble metals, in particular palladium, is assisted by the presence of oxidising substances: in view of this, if the synthesis makes use of barium, for example, it may be convenient to use $BaO_2$, otherwise $H_2O_2$ may be used. For the preparation of solutions containing Zr it is possible to use Zr isopropoxide (in an isopropanol solution) or hydrated zirconia. If Zr isopropoxide is used, it is necessary to carry out its hydrolysis by boiling it in a citric acid solution for a few hours until a clear solution is obtained Concentration and Drying of the Overall Solution The concentration may be carried out in a rotavapor. The viscous material that is obtained after this operation is then dried in a vacuum oven, typically at up to 200–220° C., in order to obtain a solid with a meringue-like consistency. This solid is then crushed and sieved in order to obtain a fine powder—with particle dimensions lower than, say 0.4 mm (100 mesh).

The initial overall solution could also be spray-dried, ideally utilising a fluid, such as $CO_2$, under supercritic conditions; alternatively it may be employed for the impregnation of a support, such as silica or alumina, in order to produce a supported catalyst.

Decomposition of the Organic Substance

The powders obtained from the previous step contain a high percentage of organic material which should be decomposed by oxidation. Best results are obtained utilising mild conditions, involving, for example, a flow of $N_2$ containing 1.5% $O_2$. The decomposition starts at around 330 to 390° C., and the progress of the reaction can be monitored either by a continuous measure of the powder temperature or by computing the oxygen consumption from the measured oxygen concentration in the outlet flow from the reactor. The powders at this stage contain mainly an amorphous phase characterised by a good interspersion of the elements.

They may also contain a small percentage of carbon, particularly in form of carbonates.

Final Calcination

A further step of calcination at high temperature (up to, say, 800–1000° C.) is then performed in order to attain full crystallisation of the powders (11). The powders so obtained are of reliable stoichiometry and, in contrast to what occurs with other technologies, free of impurities.

In conclusion, the proposed variant of the citrate method of this invention allows for the preparation of aqueous solutions in citric acid and ammonia of very many elements of the periodic table without making use of nitrate salts. The interspersion in solution at atomic scale provides the best pre-condition for a good interspersion of the dried powder and, eventually, of the calcined powder, because the decomposition of the organic part is performed under mild conditions with good temperature control and in the absence of nitrates.

The following examples illustrate the invention in a greater detail.

EXAMPLES 1–3

Preparation of $BaZr_{1-x}Pd_xO_3$, $BaZr_{1-x}Rh_xO_3$, $Ba_{1-x}La_{2/3x}ZrO_3$ The following reagents were used, in quantities reported in tables 2, 3, 4, 5, 6, 7, 8:

Zirconium isopropoxide solution, $Zr(C_3H_7O)_4$, in isopropyl alcohol (20.4% Zr b.w.), with density 1.044 g/cm³, (Aldrich);

Citric acid monohydrate, $C_6H_8O_7*H_2O$, (99.8% b.w.), (Carlo Erba);

Ammonium hydroxide, $NH_4OH$, (25% $NH_3$ b.w.), with density 0.91 g/cm³, (Merck);

Barium peroxide, $BaO_2$, (92.66% b.w., the rest being BaO), (Materials Research, MRC);

Palladium II acetate, $Pd(C_2H_3O_2)_2$, (48.11% Pd b.w.), (Chempur);

Rhodium II acetate (36.59% Rh b.w.) (Reacton);

Lanthanum III Acetate, $La(OOCCH_3)_3*1.5H_2O$ (Reacton).

EXAMPLE 1

$BaZr_{1-x}Pd_xO_3$ preparation

Two separate solutions are prepared and then mixed together: one containing dissolved zirconium and the other barium. Palladium is mixed directly into the solution containing barium in order to facilitate the dissolution: as indicated above, the oxidising properties of barium peroxide allow for an easy dissolution of palladium. This reduction in the number of solutions to be prepared results in lower costs in the event of case of scale-up of the process.

TABLE 2

Quantities of the reagents to be used for the zirconium solution for obtaining 20 g of final catalyst.

| % Pd | $Zr(C_3H_7O)_4$ (g) | Deionised $H_2O$ (mL) | Citric acid (g) | $NH_4OH$ (mL) |
|---|---|---|---|---|
| 0 | 32.33 | 100 | 30.84 | 22 |
| 5 | 28.18 | 93 | 25.75 | 22.5 |
| 10 | 23.47 | 84 | 21.5 | 19 |
| 15 | 19.04 | 68 | 17.4 | 13 |
| 20 | 14.61 | 52 | 13.3 | 20 |
| 25 | 10.17 | 36 | 9.3 | 7.1 |
| 36.5 | 0 | 0 | 0 | 0 |

TABLE 3

Quantities of the reagents to be used for the barium and palladium solution for obtaining 20 g of final catalyst.

| % Pd | $BaO_2$ (g) | Deionised $H_2O$ (mL) | Citric acid (g) | $NH_4OH$ (mL) | $Pd(C_2H_3O_2)_2$ (g) |
|---|---|---|---|---|---|
| 0 | 12.13 | 120 | 34.7 | 15 | 0 |
| 5 | 12.07 | 118.5 | 34.15 | 40 | 2.08 |
| 10 | 12.01 | 118 | 34 | 40 | 4.22 |
| 15 | 11.90 | 117 | 37.4 | 42 | 6.24 |
| 20 | 11.84 | 116 | 33.6 | 53 | 8.32 |
| 25 | 11.75 | 116 | 33.4 | 60 | 10.40 |
| 36.5 | 11.55 | 120 | 38.4 | 102.5 | 15.18 |

The first to be dissolved is zirconium. The citric acid solution is added to the zirconium isopropoxide, the products of hydrolysis being kept boiling under vigorous stirring conditions. The dissolution occurs in about eight hours. The iced-cooled ammonium hydroxide solution is then added to the zirconum solution, also previously ice-cooled.

The dissolution of barium peroxide requires a strong excess of citric acid compared to that proposed for the traditional citrate route.

A citric acid solution is prepared in the quantity necessary for the dissolution of both barium and palladium. Barium peroxide is slowly added with stirring to the citric acid solution at room temperature in order to minimise the formation of lumps. A slow and controlled development of small bubbles of oxygen is observed. As soon as the barium is dissolved, palladium acetate is added. The vessel is then ice-cooled and the calculated amount of ammonium hydroxide solution is added.

A transparent solution is obtained which is added to the cold zirconium solution previously prepared. The solution is then concentrated in a rotavapor.

The preparation described above is carried out for all the $BaZr_{1-x}Pd_xO_3$ samples.

EXAMPLE 2

$BaZr_{1-x}Rh_xO_3$ preparation

TABLE 4

Quantities of the reagents to be used for the zirconium solution for obtaining 20 g of final catalyst.

| % Rh | $Zr(C_3H_7O)_4$ (g) | Deionised $H_2O$ (mL) | Citric acid (g) | $NH_4OH$ (mL) |
|---|---|---|---|---|
| 2.5 | 30.137 | 115 | 36.4 | 86.4 |
| 5 | 27.808 | 104 | 33.2 | 86.4 |
| 10 | 23.51 | 84 | 21.5 | 19 |
| 18.58 | 14.22 | 72 | 17.82 | 38 |

TABLE 5

Quantities of the reagents to be used for the barium and rhodium solution for obtaining 20 g of final catalyst.

| % Rh | $BaO_2$ (g) | Deionised $H_2O$ (mL) | Citric acid (g) | $NH_4OH$ (mL) | Rh(II) acetate (g) |
|---|---|---|---|---|---|
| 2.5 | 12.059 | 125 | 33.4 | 86.4 | 1.3665 |
| 5 | 12.092 | 125 | 33.3 | 86.4 | 2.7330 |
| 10 | 12.023 | 118 | 34 | 40 | 5.4659 |
| 18.58 | 10.476 | 133 | 33.15 | 131 | 9.3162 |

The zirconium solution is prepared in a similar way to that described for the palladium containing systems. The barium containing solution is also prepared in a similar way, and the citric acid computed for the complexation of rhodium is directly added to the citric acid computed for barium, as before. Rhodium acetate followed by ammonium hydroxide are then added to the solution containing barium. The transparent solution so obtained is then concentrated in a rotavapor.

EXAMPLE 3

$Ba_{1-x}La_{2/3x}ZrO_3$ preparation

TABLE 6

Quantities of the reagents to be used for the zirconium solution for obtaining 20 g of final catalyst.

| X | $Zr(C_3H_7O)_4$ (g) | Deionised $H_2O$ (mL) | Citric acid (g) | $NH_4OH$ (mL) |
|---|---|---|---|---|
| 0.25 | 32.277 | 168.9 | 42.226 | 135.15 |

TABLE 7

Quantities of the reagents to be used for the barium and rhodium solution for obtaining 20 g of final catalyst.

| X | $BaO_2$ (g) | Deionised $H_2O$ (mL) | Citric acid (g) | $NH_4OH$ (mL) |
|---|---|---|---|---|
| 0.25 | 9.499 | 95 | 23.752 | 101.36 |

TABLE 8

Quantities of the reagents to be used for the barium and rhodium solution for obtaining 20 g of final catalyst.

| X | $La(OOCCH_3)_3$* $1.5H_2O$ | Deionised $H_2O$ (mL) | Citric acid (g) | $NH_4OH$ (mL) |
|---|---|---|---|---|
| 0.25 | 4.5109 | 16 | 3.958 | 8.45 |

The solution containing zirconium is prepared in a similar way to that described for the palladium and rhodium containing systems. The solution containing barium is also prepared in a similar way. The solution containing lanthanum is then prepared; this solution is best obtained using the crystalline form of lanthanum acetate containing 1.5 moles of water (as for the reagent previously proposed). To obtain this solution the citric acid solution is ice-cooled and added with ice-cooled ammonium hydroxide solution and then with the lanthanum acetate. A transparent solution is obtained in a few minutes. The three solutions containing zirconium, barium and lanthanum are mixed together and the resulting solution is concentrated in a rotavapor. The operating conditions for this step, which lasts for about an hour are:

Temperature≅80° C.;

Pressure⇒initial≅250 mbar; final 50≅mbar;

Revolution speed=100 rpm.

The products obtained from the rotavapor are very viscous solutions with a honey-like consistency; drying is completed under vacuum, in a vacuum oven.

The vacuum is connected via a liquid nitrogen trap to eliminate ammonia and other light substances coming from the sample. Vacuum is obtained with a double stage pump (RC5 Vacuubrand).

Drying has been performed with the following thermal program:

Temperature rise from ambient to 50° C. in 15 minutes;

Temperature rise from 50° C. to 200° C. in 50 hours;

Dwell at 200° C. for 10 hours;

Temperature decrease to ambient (uncontrolled speed).

The dried samples have a meringue-like consistency, and are easily ground and sieved through a 100 mesh sieve. The powders are then put in a tubular quartz reactor 5 cm i.d. and decomposed in a fluidised bed. The inlet gas flow to the reactor (of 94% $N_2$ and 6% air) is maintained at a flow rate of 120 l/h.

The treatment in the fluidised bed is performed in two stages. In the first stage, at 330° C.–380° C., most of the organic matter is decomposed. When the combustion appears to be almost ended (judged by the lowering of the powder temperature) the air content of the feed gas may be gradually increased until it becomes solely air; this is achieved without altering the total gas flow rate. Calcination of the samples is then performed with the following programme:

Heating from 380° C. to 500° C. at a rate of 2° C./min;
Dwell at 500° C. for 4 hours;
Lowering of the total flow from 120 L/h down to 60 L/h;
Heating from 500° C. to 800° C. at a rate of 2° C./min;
Dwell at 800° C. for 10 hours;
Cooling down to 25° C. in 4 hours.

EXAMPLE 4

Preparation of the $BaZr_{1-x}Ce_xO_3$ samples

The following reagents were used, in quantities reported in Tables 9 and 10:

Zirconium isopropoxide solution, $Zr(C_3H_7O)_4$, in isopropyl alcohol (20.4% b.w.), with density 1.044 g/cm³, (Aldrich);
Citric acid monohydrate, $C_6H_8O_7*H_2O$, (99.8% b.w.), (Carlo Erba);
Ammonium hydroxide, $NH_4OH$, (25% b.w. of $NH_3$), with density 0.91 g/cm³, (Merck);
Barium peroxide, $BaO_2$, (92.66% b.w., the rest being BaO), (Materials Research, MRC);
Cerium acetate (III) tetrahydrate, $Ce(C_2H_3O_2)_3*4H_2O$, (99.9% b.w.), (Chempur);

Two separate solutions are prepared and then mixed together: one containing dissolved zirconium, the other barium and the cerium.

TABLE 9

Quantities of the reagents to be used for the zirconium solution for obtaining 20 g of final catalyst.

| Ce | $Zr(C_3H_7O)_4$ (g) | Deionised $H_2O$.(mL) | Citric acid (g) | $NH_4OH$ (mL) |
| --- | --- | --- | --- | --- |
| 6.48 | 27.46 | 137.6 | 34.40 | 110.16 |
| 12.77 | 22.74 | 113.95 | 28.49 | 91.23 |
| 24.77 | 13.73 | 68.79 | 17.19 | 55.06 |
| 43.05 | 0 | 0 | 0 | 0 |

TABLE 10

Quantities of the reagents to be used for the barium and cerium solution for obtaining 20 g of final catalyst.

| % Ce | $BaO_2$ (g) | Deionised $H_2O$ (mL) | Citric acid (g) | $NH_4OH$ (mL) | Cerium acetate (g) |
| --- | --- | --- | --- | --- | --- |
| 6.48 | 11.88 | 131.51 | 30.19 | 123.74 | 3.60 |
| 12.77 | 11.61 | 136.26 | 29.51 | 120.96 | 7.09 |
| 24.77 | 11.10 | 145.35 | 28.22 | 115 | 13.76 |
| 43.05 | 10.33 | 159.20 | 26.25 | 107.58 | 23.91 |

The zirconium solutions are prepared in a similar way for that described for the $BaZr_{1-x}Pd_xO_3$, $BaZr_{1-x}Rh_xO_3$, $Ba_{1-x}La_{2/3x}ZrO_3$ systems.

Cerium acetate is added to the aqueous solution of citric acid in the quantity necessary for the complexation of both cerium and barium; the resulting product, after stirring for about 16 hours at room temperature, resembles lean yoghurt both in appearance and consistency. By adding barium peroxide the colour is changed to light brown, and small gas bubbles develop.

After mixing for about ten minutes and cooling in an ice and water bath, ammonium hydroxide is added. A transparent, dark brown solution is obtained. The solution containing zirconium is then added and the overall solution so obtained is mixed for about half an hour, after which a perfectly clear, dark orange solution is obtained, which may be concentrated in the rotavapor. The various steps of concentration in the rotavapor, drying in the vacuum oven, decomposition in the fluidised bed and calcination are similar to those for the other samples.

EXAMPLE 5

Characterisation of the $BaZr_{1-x}Pd_xO_3$ samples

Figure 3:
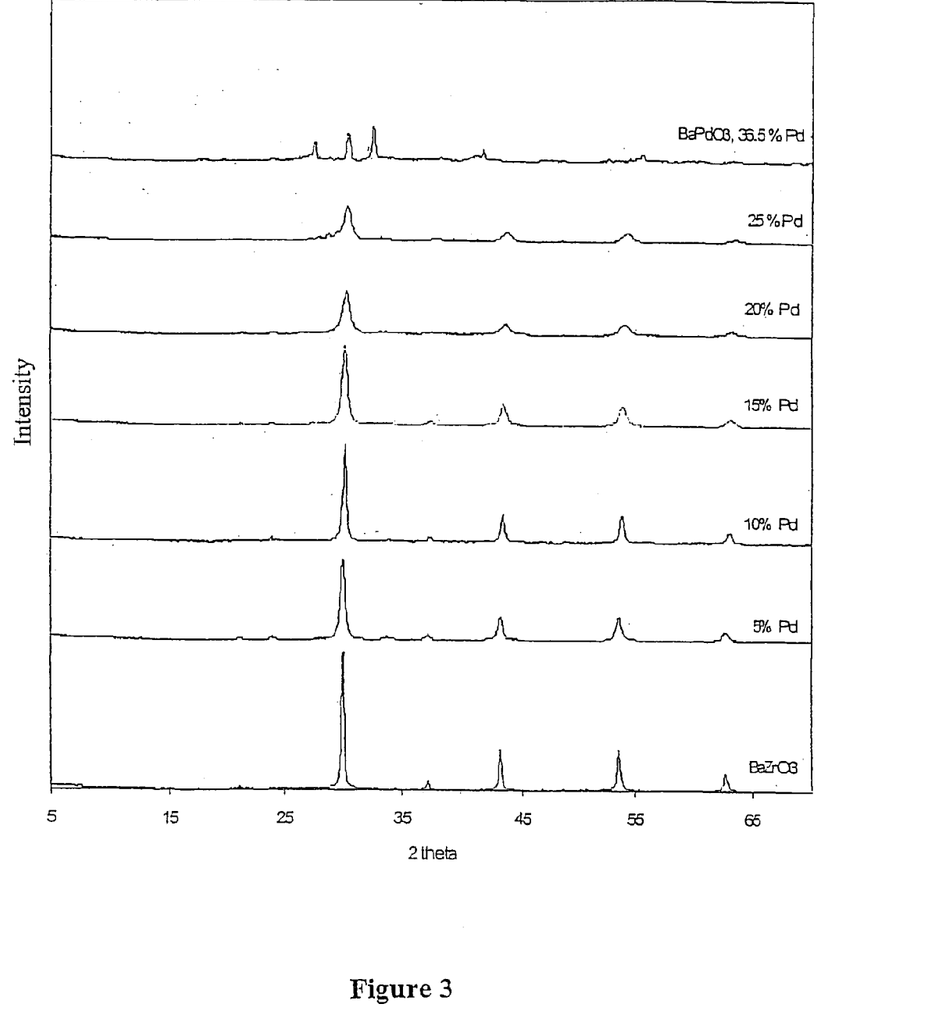
FIG. 3 illustrates the XRD diffractograms of various $BaZr_{1-x}Pd_xO_3$ samples calcined at 800° C. for 4 hours.

FIG. 3 shows the XRD diffractograms of various $BaZr_{1-x}Pd_xO_3$ samples calcined at 800° C. for 4 hours.

It can be seen that the sample corresponding to the stoichiometry of $BaPdO_3$ (i.e. with 36.6 Pd b.w.) shows a diffractogram that is rather different from the others. This sample, when calcined at higher temperatures, does not form the perovskite phase; this confirms that the presence of a certain quantity of zirconium in the oxide is necessary in order to obtain this phase—as indicated in the first claim.

The various phases were identified by the search-match method (JCPDS data base) while the phase compositions and cell parameters were determined with great accuracy by full profile fitting refinement (Rietvield method) (16), using the Hill&Howard procedure (17), the WYRIET program and the structural data necessary from ICDS (18), thus obtaining the quantitative phase compositions shown in table 11.

TABLE 11

| Pd weight % | x | Calcination | $BaZr_{1-x}Pd_xO_3$ weight % | $BaCO_3$ weight % | PdO weight % |
|---|---|---|---|---|---|
| 5 | 0.1309 | 800° C. (air) | 100 | — | — |
| 10 | 0.2637 | 800° C. (air) | 100 | — | — |
| 15 | 0.3985 | 800° C. (air) | 96.5 | 3.5 | — |
| 15 | 0.3985 | 1200° C. (air) | 92.5 | — | 7.5 |
| 20 | 0.5352 | 800° C. (air) | 91 | 3 | 6 |

Cell parameters of the perovskite phase were determined, to forth decimal place precision, for samples containing palladium from 0 to 20% b.w. Table 12 gives the values found.

TABLE 12

| Pd weight % | x | Calcination | A [Å] | Crystal size [Å] | V [Å³] |
|---|---|---|---|---|---|
| 0 | 0 | 800° C. (air) | 4.1830(1) | 360 | 73.19 |
| 5 | 0.1309 | 800° C. (air) | 4.1799(1) | 220 | 73.03 |
| 10 | 0.2637 | 800° C. (air) | 4.1675(1) | 305 | 72.38 |
| 15 | 0.3985 | 800° C. (air) | 4.1655(1) | 190 | 72.28 |
| 15 | 0.3985 | 1200° C. (air) | 4.1612(1) | 245 | 72.05 |
| 20 | 0.5352 | 800° C. (air) | 4.1540(1) | 145 | 71.68 |

Figure 4:
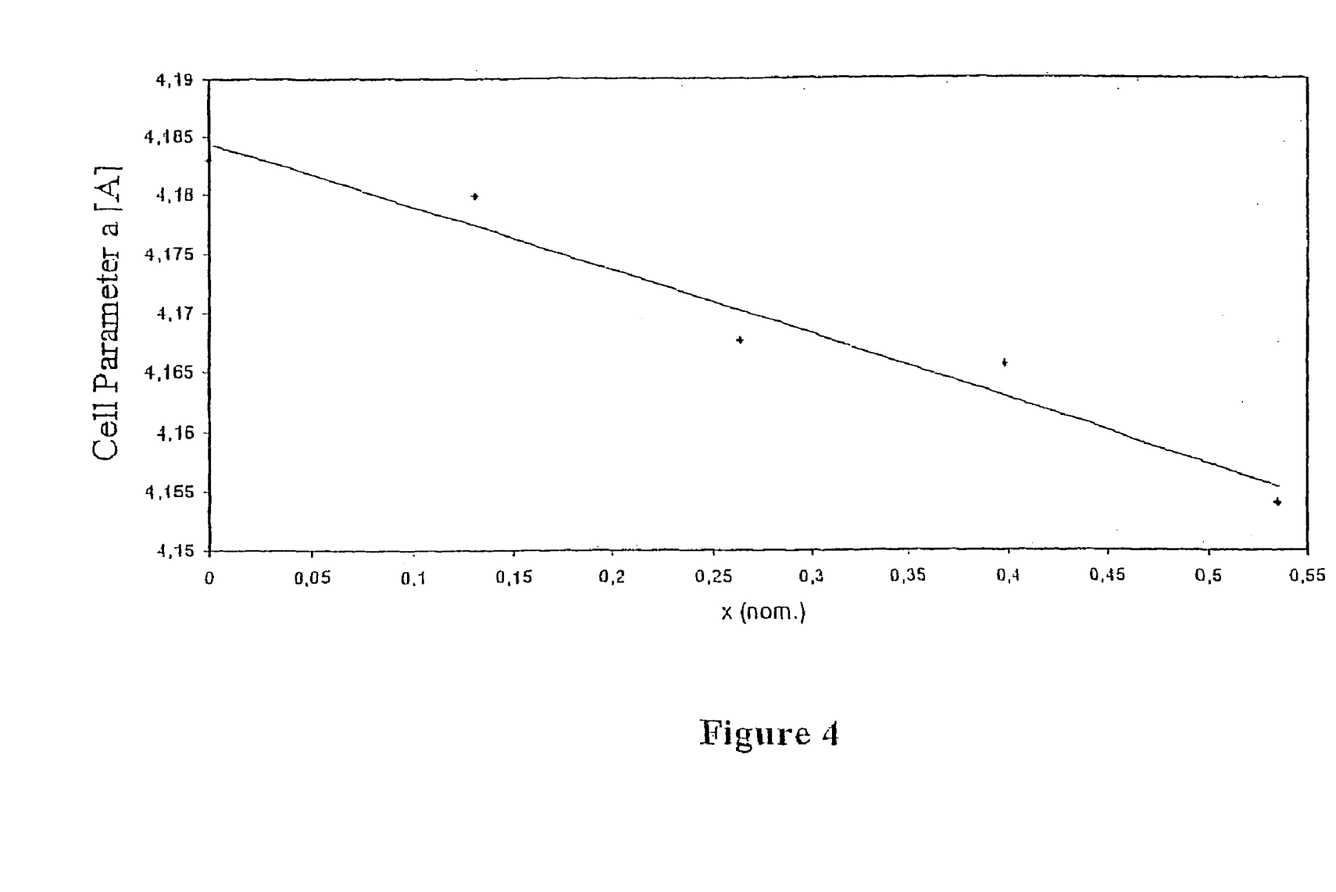
FIG. 4 illustrates the cell parameters of a perovskite phase for selected values of x.

The unusually precise determination of the cell parameters, due to an excellent fitting of the experimental data, shows unequivocally that the cell is perfectly cubic, with zirconium and palladium completely randomly distributed among the sites B of the perovskite. The steady decrease of the cell parameter with the increase of the noble metal content inside the structure, as shown in the previous table, and in FIG. 4, indicates that the noble metal is present in a high oxidation state, probably as $Pd^{+4}$. Indeed it should be recalled that only $Pd^{+4}$ in octahedral co-ordination presents an anionic radius (75.5 pm) smaller than the ionic radius of $Zr^{+4}$ in the same co-ordination (86 pm).

The presence of palladium within the structure in a high oxidation state reveals its lesser tendency to be reduced to the metallic state, with consequential deactivation, as seems to be confirmed by the high temperature thermogravimetric data.

It is possible to maximise the surface area of the samples by drying them under vacuum and low water partial pressure conditions at a temperature of up to about 200° C. This can be done either by employing very long drying times or by periodically purging the vacuum oven with dry air (by, say, introducing an air flow at regular interval, followed by full vacuum periods).

Catalytic activity data for the combustion of methane have been obtained for samples for which the surface areas have yet to be optimised. To perform these tests, 0.4 g of catalyst are mixed with 0.8 g of quartz, (140–200 mesh) and placed inside a quartz microreactor with internal diameter 8 mm. A layer of quartz particles, within the 20–30 mesh range and 12 cm thick, are then placed above the catalytic bed.

A gaseous, constant composition stream is fed to the reactor at a constant flow rate, and the appropriate temperature-time profile is applied:

Inlet Gas Composition

Methane: 1%, Oxygen: 4%, Nitrogen: 95%;

Flow

24 L/h

Figure 5:
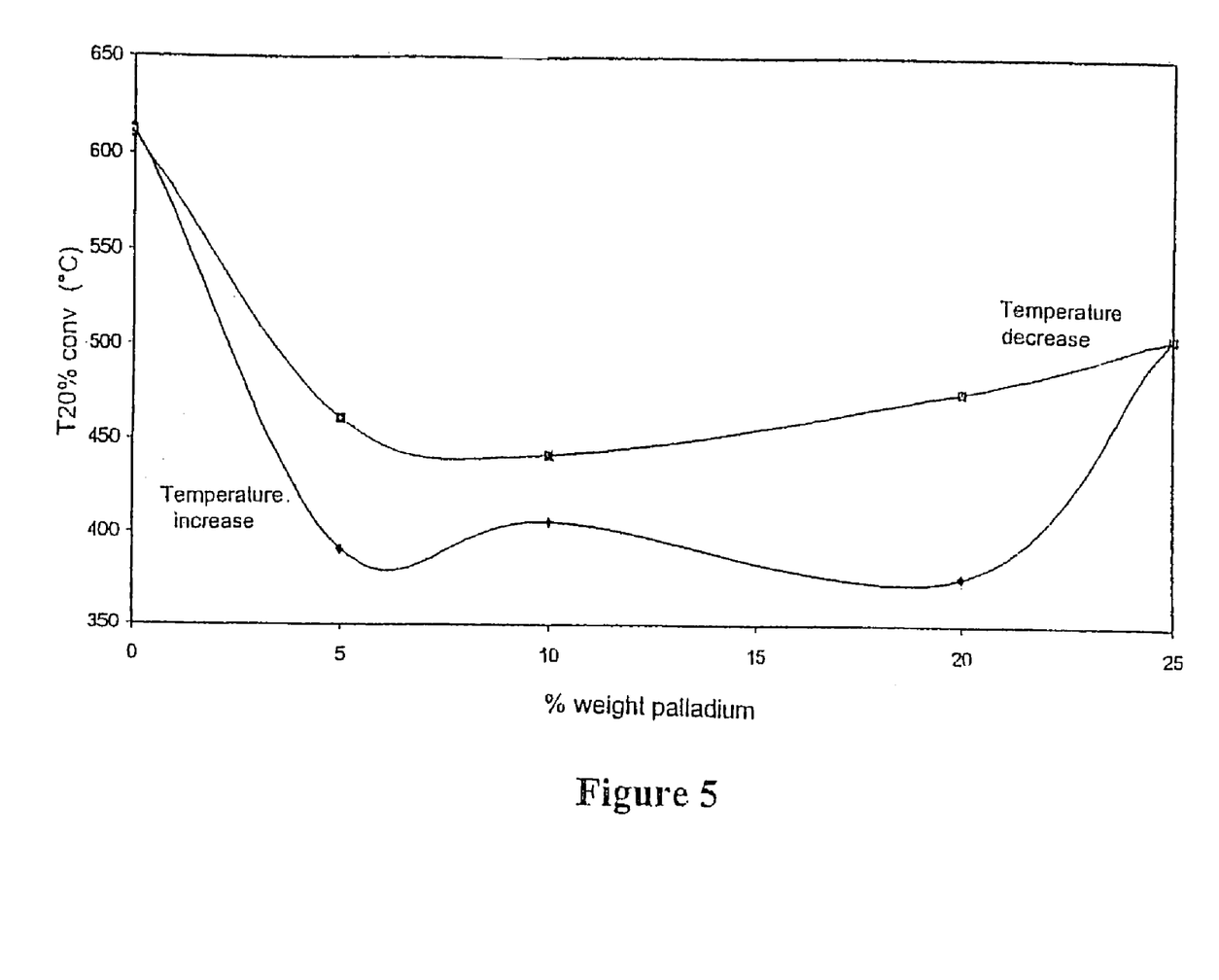
FIG. 5 illustrates the temperature at which 20% conversion is reached in runs employing both a gradually increasing and a gradually decreasing temperature.

FIG. 5 reports the temperature at which 20% conversion is reached in runs employing both a gradually increasing and a gradually decreasing temperature.

Figure 6:
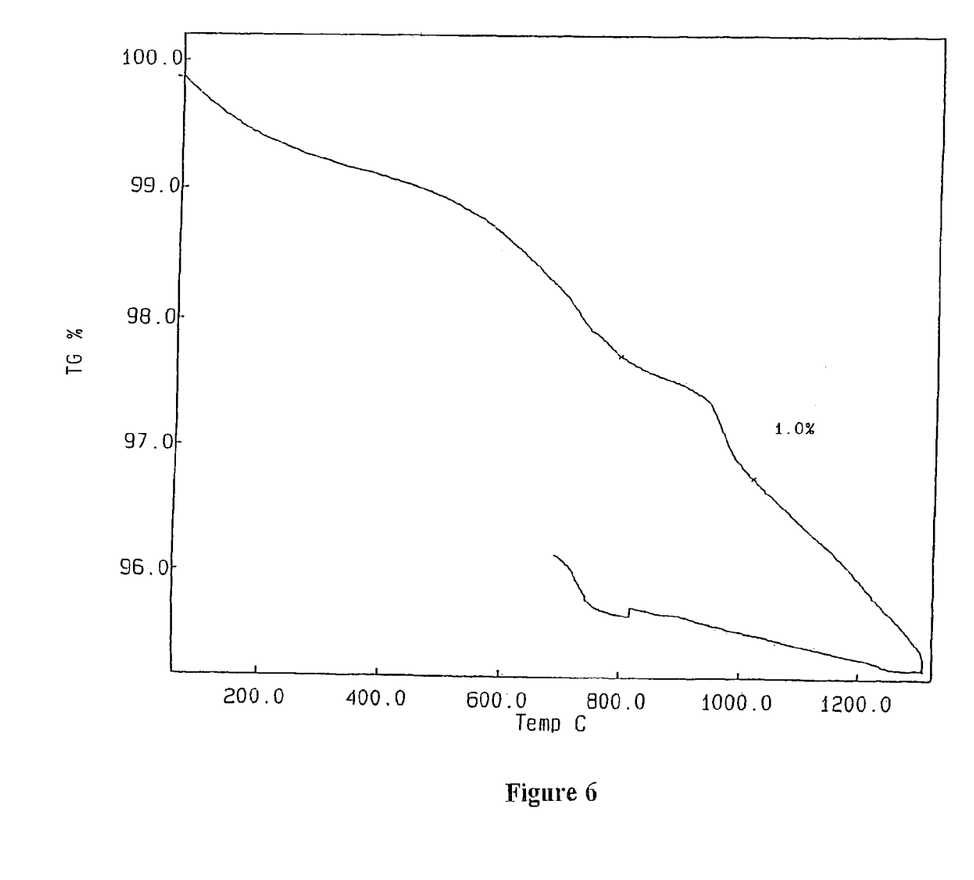
FIG. 6 illustrates the results of thermogravimetric analysis (TGA) performed on a 15% by weight Pd sample.
Figure 7:
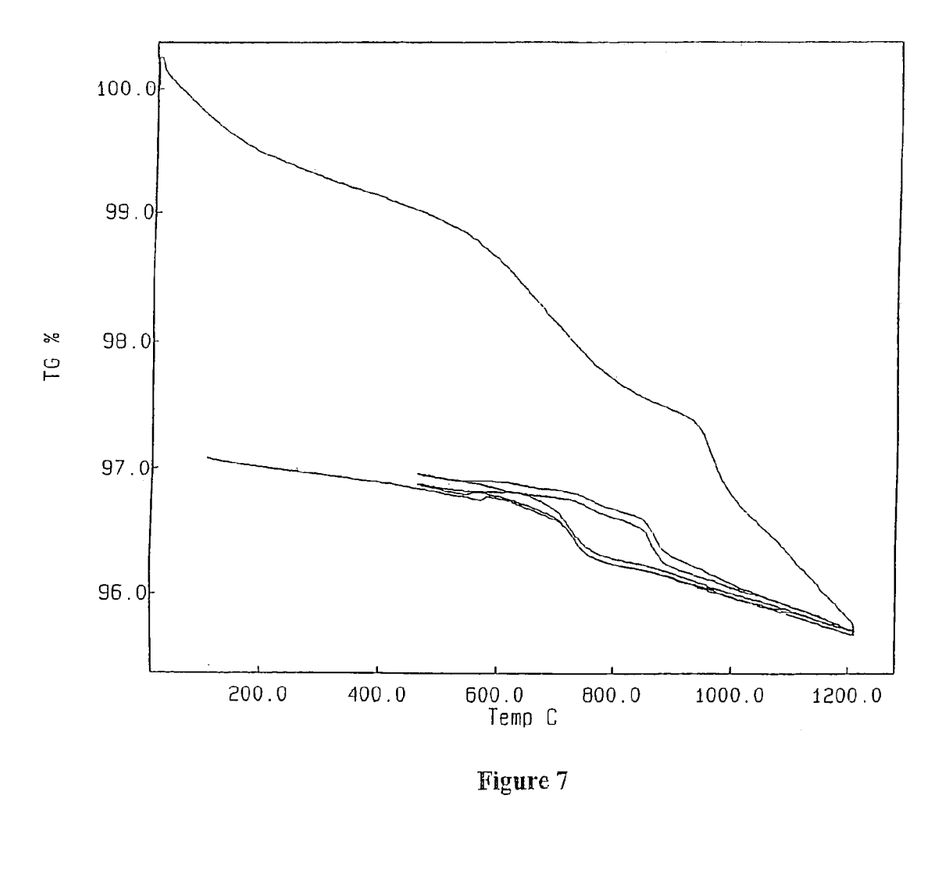
FIG. 7 illustrates the results of thermogravimetric analysis (TGA) performed on a 15% by weight Pd sample.

FIGS. 6 and 7 show the results of thermogravimetric analysis (TGA) performed on the 15% b.w. Pd sample. It is noteworthy that the first onset of reduction of palladium occurs at about 100° C. higher than in the following cycles in which PdO supported on the perovskite should be present. In other words it confirms that the perovskite stabilizes palladium by making its reduction more difficult than in simply supported palladium.

The $BaZr_{0.6015}Pd_{0.3985}O_3$ sample (15% b.w. of Pd) was calcined at 1200° C. in an oven operating with static air. Table 1 gives the quantitative phase composition measured and Table 2 the cell parameter (a) and cell volume (V). It shows that only about 50% of the palladium is extracted from the perovslkite and transformed at room temperature into PdO. This means that the other half of palladium is still within the perovskite structure at 1200° C. The cell parameter is significantly increased with respect to the same sample calcined at 800° C., in agreement with the decreased content of palladium within the perovskite phase.

EXAMPLE 6

Characterisation of the $BaZr_{1-x}Ce_xO_3$ samples

Figure 8:
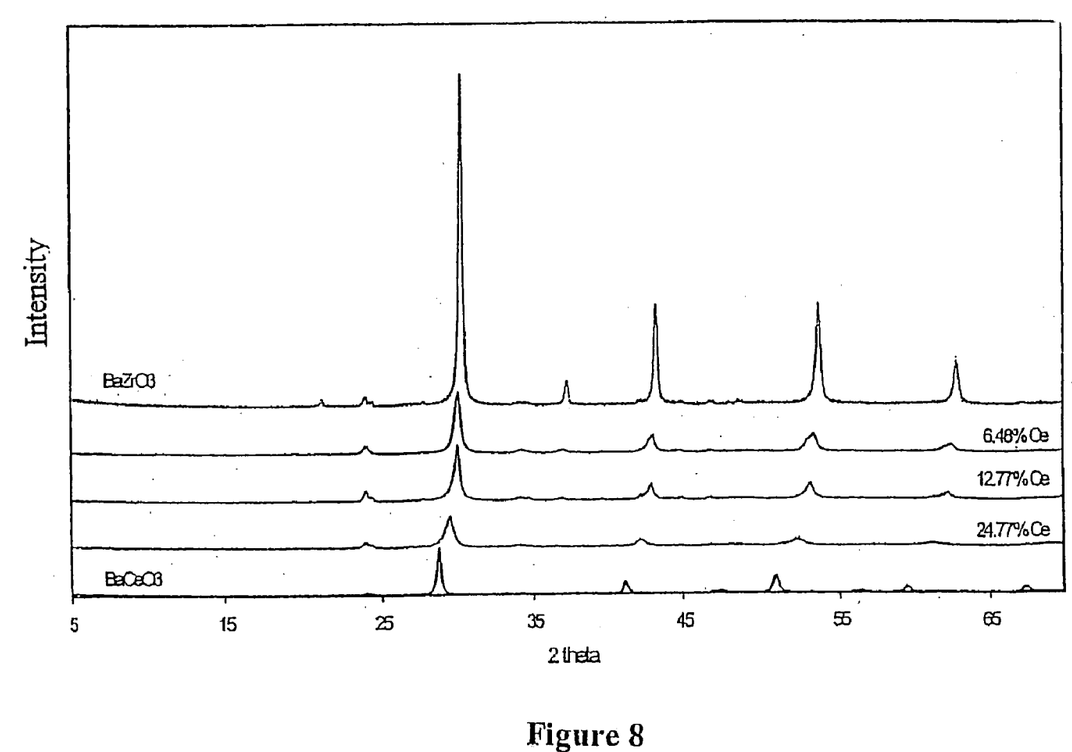
FIG. 8 illustrates the diffractograms obtained on different samples of $BaZr_{1-x}Ce_xO_3$ with different weights of cerium, calcined at 800° C. for 10 hours.

FIG. 8 shows the diffractograms obtained on the different samples of $BaZr_{1-x}Ce_xO_3$ with different weights of cerium, calcined at 800° C. for 10 hours. It can be observed that the greater the cerium content in the sample, the less intense the characteristic peaks of the perovskite phase, which are also shifted to lower angles, indicating an increase in cell volume. Table 13 reports the quantitative phase composition for all samples.

TABLE 13

| Ce weight % | X | $BaZr_{1-x}Ce_xO_3$ weight % | $BaCO_3$ weight % | $CeO_2$ % weight % |
|---|---|---|---|---|
| 6.48 | 0.1309 | 85 | 15 | — |
| 12.77 | 0.2637 | 79 | 21 | — |
| 24.77 | 0.3985 | 77 | 23 | — |
| 43.05 | 0.5352 | 77 | 10 | 13 |

Table 14 shows the cell parameters found for the different samples synthetised.

TABLE 14

| Ce weight % | X | a [Å] | V [Å³] |
|---|---|---|---|
| 0 | 0.1309 | 4.1830(1) | 73.2 |
| 6.48 | 0.2637 | 4.2114(2) | 74.7 |
| 12.77 | 0.3985 | 4.2212(2) | 75.2 |
| 24.77 | 0.5352 | 4.2893(4) | 78.9 |

For the BaCeO$_3$ sample (i.e. containing 43.05% Ce b.w., x=1): the following lattice parameters were obtained:

Orthorhombic phase⇒a=6.204(1)Å;b=6.235(1)Å;
c=8.760(1) Å;V=338.9 Å$^3$;

Cubic phase⇒a=4.3924(2)Å;V=84.7 A$^3$.

Figure 9:
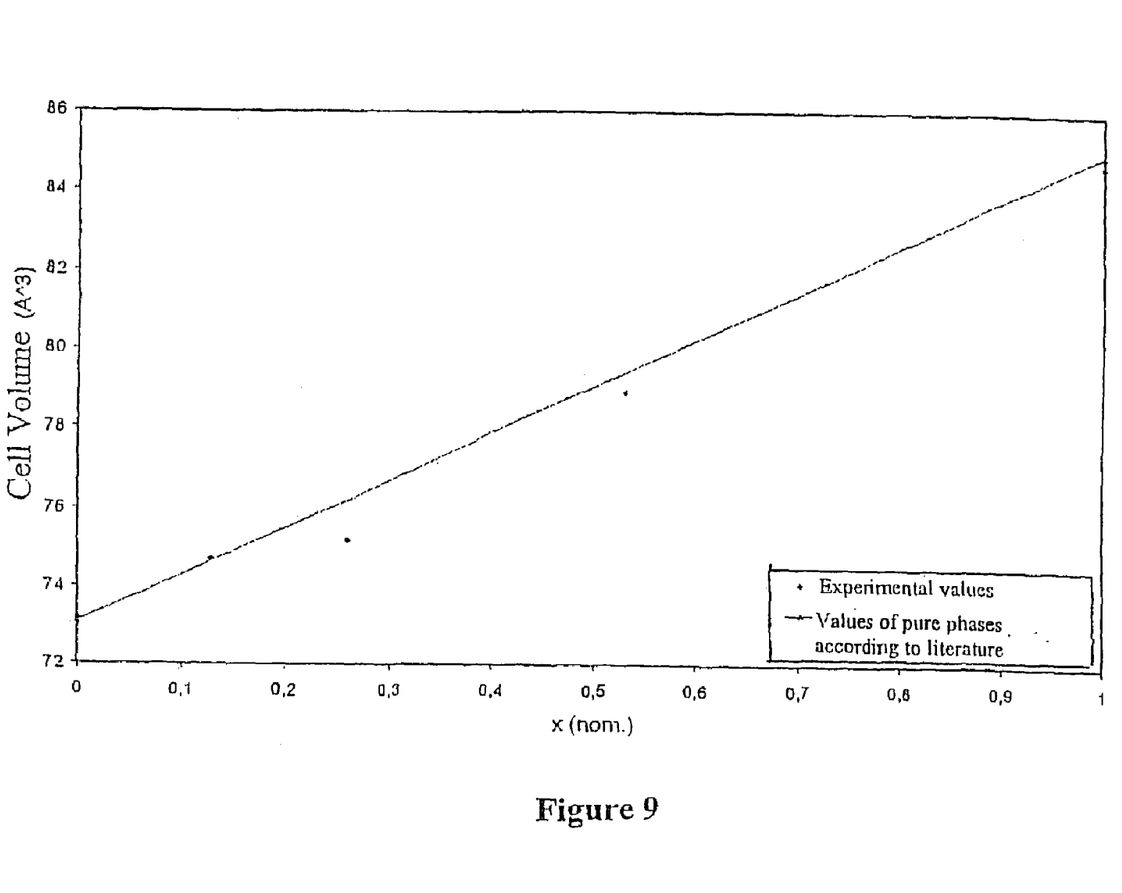
FIG. 9 illustrates the cell parameters of a perovskite phase for selected values of x and cell volume.

It can be observed that the substitution of zirconium with cerium involves, as frequently observed for perovskites, a deviation from the ideal classical cubic structure because the cerium ion (Ce$^{+4}$) in octahedral co-ordination has a radius (128 pm) greater than that of zirconium (Zr$^{+4}$) with the same co-ordination (86 pm). This substitution thus results in a certain distortion, and as a consequence, the formation of a phase which is no longer cubic but orthorhombic. For this reason, in FIG. 9 the cell volume (V), rather than (a), is-reported as a function of x.

In addition, various phases were identified by the search-match method (JCPDS data base), while the phase composition and the cell parameters were determined with great accuracy by full profile fitting refinement. In this search the Rietvield method was used (16), following the Hill&Howard procedure (17) and the WYRIET program. The necessary structural data were taken from ICDS (18).

Catalytic activity tests were performed using 0.4 g of catalyst (with surface area not optimised) mixed with 0.8 g of quartz (140–200 mesh) and placed inside a microreactor of 8 mm i.d. On top of the catalytic bed a 1.2 cm layer of quartz particles (20–30 mesh) is placed. A gas flow, constant in composition and rate, was used:

Inlet Gas Composition

Methane: 0.8%; Oxygen: 95.7%; Nitrogen: 3.5%

Flow Rate

400 Ncc/min

Figure 10:
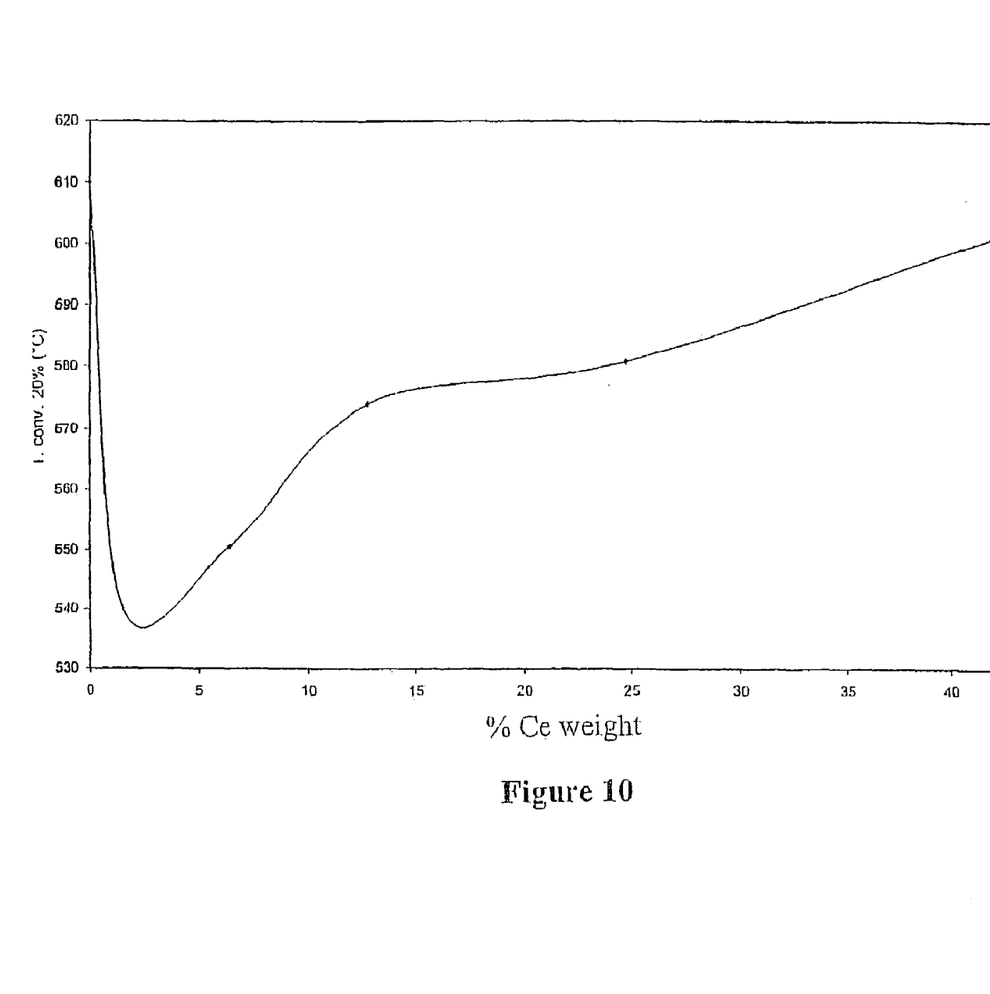
FIG. 10 illustrates the temperatures at which 20% conversion is reached in runs performed at increasing temperature as a function of the percent by weight of the cerium in the perovskite.

FIG. 10 gives the temperatures at which 20% conversion is reached in runs performed at increasing temperature. The data were obtained using samples not optimised in surface area.

EXAMPLE 7

Characterisation of the BaZr$_{1-x}$Rh$_x$O$_3$ samples

Table 15 shows the cell parameters as a function of x. These data show a constant and regular decrease of the cell parameters. As in the palladium containing systems, these rhodium containing systems show that rhodium is present in a high oxidation state, probably as Rh$^{+4}$.

TABLE 15

| x | Rh wt. % | a (Å) | V (Å$^3$) |
|---|---|---|---|
| 0 | — | 4.1815 | 73.11 |
| 0.0674 | 2.5 | 4.1816(1) | 73.12 |
| 0.0674 | 2.5 | 4.1813(1) | 73.10 |
| 0.1351 | 5 | 4.1803(1) | 73.05 |
| 0.2718 | 10 | 4.1640(1) | 72.20 |
| 0.5101 | 18.58 | 4.1377(2) | 70.84 |

EXAMPLE 8

Characterisation of the Ba$_{1-x}$La$_{2/3x}$ZrO$_3$ samples

Table 16 shows the values of the cell parameter a and the cell volume V for the sample with x=0.25

TABLE 16

| x | a (Å) | V (Å$^3$) |
|---|---|---|
| 0.25 | 4.1730(1) | 72.67 |

The smaller steric requirements of La$^{+3}$ compared to Ba$^{+2}$ leads to a small decrease in the cell volume.

Thermal Stability Tests

Numerous tests of thermal stability were performed at various stages of the preparation and for different sample compositions: on the solution and on dried samples at various temperatures. Tests were performed with a differential scanning calorimeter DSC Mettler 800, using stainless steel closed crucibles, from room temperature up to 780° C. in air, and with a heating rate of 10° C. All the samples showed a good stability and may therefore be handled safely. This is in contrast to current literature warnings that, for example, BaO$_2$ should not be mixed with water: such restrictions need not apply for water solutions of citric acid, which allow for the complexation of barium with a gradual and controlled release of oxygen in the form of small gas bubbles, thereby ensuring safe working.

REFERENCES

1) 'Concise Encyclopaedia of Advanced Ceramic Materials' 349–351, Ed. R. J. Brook, Pergamon Press;
2) J. E. Huheey, 'Inorganic chemistry: Principle of structure and reactivity (3$^{rd}$ edition)', University of Maryland-Harper Collins Publishers;
3) J. G. Mc Carty, M. Gusman, D. M. Lowe, D. L. Hildenbrand, K. N. Lau, Catalysis Today 47 (1999) 5–17;
4) A. K. Datye, J. Bravo, T. R. Nelson, P. Atanasova, M. Lyubovsky, L. Pfefferle, Applied Catalysis 198 (2000) 179–196;
5) K. Fujimoto, F. H. Ribeiro, M. Avalos-Borja, E. Iglesia, Journal of Catalysis 179 (1998) 431;
6) Italian Patent Application MI 96 A 002011;
7) Christian Marcilly, Bernard Delmon, C. R. Acad. Paris, t. 268 (18 May 1969) Série C 1795;
8) Philippe Courty, Bernard Delmon, C. R. Acad. Paris, t. 268 (18May 1969) Série C 1874;
9) Philippe Courty, Bernard Delmon, Powder Technology 7 21 (1973);
10) Bernard Delmon, Christian Marcilly, AndréSugier, Philippe Courty, Brevet n° 1604707 déposé le 2 juillet 1968;
11) Philippe Courty et al, DE 1933331 Jan. 29, 1970
12) André Sugier, Bernard Delmon, Brevet n° 7013305 déposé le 13 avril 1970;
13) PCT/EP91/02404;
14) PCT/EP90/01823;
15) Italian Patent Application MI 93 A 002704;
16) R. A. Young, 'The Rietveld Method', International Union of Crystallography, Oxford University Press 1993;
17) R. J. Hill, C. J. Howard, J. Appl. Ciyst. 20 (1987) 467;
18) 'Inorganic Crystal Structure Database', Karlsruhe Gmelin Institut für Anorganische Chemie und Fachinformationszentrum FIZ Karlsruhe (1997).

The invention claimed is:

1. A composition comprising a perovskite structure in the form of solid solutions of general formula: A$_z$Zr$_{1-x}$B$_x$O$_3$
where A is Ba or a rare earth element,
B is Pt, Ir, Pd, Rh or Ce,
Z is 1 when A is Ba and ⅔ when A is a rare earth,
X is in the range 0.01–0.8.

2. The composition according to claim 1 in which A is Ba or La.

3. The composition according to claim 1 in which B is Pd, Rh, or Ce.

4. The composition according to claim 3, taken from $BaZr_{1-x}Pd_xO_3$, $BaZr_{1-x}Ce_xO_3$, or $BaZr_{1-x}Rh_xO_3$.

5. A method for oxidation comprising exposing a reactant to oxygen in the presence of a catalyst, said catalyst comprising the composition of claim 1.

6. The method according to claim 5, wherein said reactant is methane, and oxygen is included in air, such that said exposing causes catalytic combustion of methane.

7. The method according to claim 5, wherein said reactant is methane, and said exposing is catalytic partial oxidation of methane to syngas.

8. The method according to claim 5, wherein said exposing occurs in a catalytic muffler for motor vehicles, said muffler containing said catalyst.

9. The method according to claim 5, wherein said reactant comprises VOC, and said exposing causes the elimination of VOC.

10. The method according to claim 5, wherein said reactant comprises light alkanes, and said exposing produces olefins from said alkanes.

* * * * *